United States Patent
Gupta et al.

[19]

[11] Patent Number: 5,987,322
[45] Date of Patent: Nov. 16, 1999

[54] SYSTEM SPECIFIED ADAPTIVE MOBILE STATION BEHAVIOR WITHIN A MOBILE TELECOMMUNICATIONS SYSTEM

[75] Inventors: Sudeep Gupta; Charles Brian Fowler, both of Dallas, Tex.

[73] Assignee: Ericsson Inc., Research Triangle Park, N.C.

[21] Appl. No.: 08/835,156

[22] Filed: Apr. 3, 1997

[51] Int. Cl.⁶ .................................................. H04B 1/00
[52] U.S. Cl. .......................... 455/432; 455/69; 455/446
[58] Field of Search ..................................... 455/432, 433, 455/434, 435, 422, 550, 436, 507, 67.3, 68, 69, 446, 522

[56] References Cited

U.S. PATENT DOCUMENTS

| | | | |
|---|---|---|---|
| 5,056,109 | 10/1991 | Gilhousen et al. | 455/522 |
| 5,097,499 | 3/1992 | Cosentino | 455/33 |
| 5,257,405 | 10/1993 | Reitberger | 455/67.3 |
| 5,444,765 | 8/1995 | Mauri et al. | 455/432 |
| 5,590,397 | 12/1996 | Kojima | 455/33.1 |
| 5,778,304 | 7/1998 | Grube et al. | 455/507 |
| 5,822,310 | 10/1998 | Chennakeshu et al. | 455/10 |
| 5,831,545 | 11/1998 | Murray et al. | 455/67.3 |
| 5,862,477 | 1/1999 | Wellard et al. | 455/446 |

FOREIGN PATENT DOCUMENTS

| | | |
|---|---|---|
| 0 757 453 | 7/1996 | European Pat. Off. . |
| WO 93/07702 | 4/1993 | WIPO . |
| WO 94/07322 | 3/1994 | WIPO . |
| WO 96/05709 | 2/1996 | WIPO . |

OTHER PUBLICATIONS

PCT International Search Report, Nov. 5, 1998, PCT/US 98/06546.

*Primary Examiner*—Nguyen Vo
*Assistant Examiner*—Greta J. Fuller
*Attorney, Agent, or Firm*—Jenkens & Gilchrist, P.C.

[57] ABSTRACT

Each cell area within a mobile telecommunications service area is categorized in accordance with its associated terrestrial conditions and irregularities. As an illustration, each cell area is categorized as either a urban, suburban or rural area. Data indicative of the assigned category are then broadcast over a control channel to all mobile stations currently traveling within the respective cell area. The mobile stations then utilize the received data to determine appropriate air-interface settings and parameters and effectuate location adaptive air-interfaces with a serving mobile telecommunications network.

28 Claims, 6 Drawing Sheets

SYSTEM SPECIFIED ADAPTIVE MOBILE STATION BEHAVIOR WITHIN A MOBILE TELECOMMUNICATIONS SYSTEM

BACKGROUND OF THE INVENTION

1. Technical Field of the Invention

The present invention relates to a mobile telecommunications system and, in particular, to location dependent adaptive air-interface behavior associated with a mobile station within such a system.

2. Description of Related Art

An "air-interface" or "radio-interface" provides the connection between a mobile station traveling within a particular cell area and a base transceiver station (BTS) providing radio coverage for that particular service area. Within both analog and digital communications systems, several natural and man-made terrestrial conditions influence the performance and the quality associated with a particular air-interface effectuated for a mobile station traveling within a particular geographic area. Such terrestrial conditions include surface irregularities, line-of-sight obstacles, buildings, trees, and mountainous areas.

A mobile service provider initially performs a cell planning or designing to define an appropriate cell layout or plan to cover a particular geographic area and to situate a plurality of base transceiver stations or antennas at particular locations to achieve maximum communication coverage and/or quality. As a result, each cell site or cell layout is planned with the consideration and evaluation of associated terrestrial conditions and obstacles.

While establishing an air-interface with a serving BTS or base station controller (BSC), the mobile station initially utilizes network provided parameters or settings. Such settings are provided by the serving mobile telecommunications network before the mobile station effectuates an air-interface. As an air-interface is maintained between a serving BTS and a particular mobile station, in order to provide an acceptable communication quality, the mobile station and/or the serving BTS continuously reports and measures the relevant data or parameters associated with the resulting air-interface to properly adjust and to switch the communications channel effectuated therebetween. Such adjustments include, for example, frequency hopping, and power output adjustments.

However, there are certain parameters or settings utilized by the mobile station that are not dynamically controllable by the serving mobile telecommunications network. For example, a mobile station is typically associated with a factory defined data sensitivity level. The data sensitivity level is utilized by the mobile station to recognize and to select a proper communication channel to effectuate an air-interface. As a result, in case a mobile station is set with a too high sensitivity level, the mobile station ignores or is unable to locate a channel while traveling within a low powered cell area (e.g., rural area, indoor area). However, if the mobile station is set with a too low sensitivity level, in case the mobile station is traveling within a urban area, too many inappropriate channels are detected by the mobile station.

As a result, since mobile station associated air-interface settings or parameters are fixed, a mobile station traveling from one service area to another service area cannot change its air-interface settings and parameters to advantageously adapt to changing terrestrial conditions.

Accordingly, there is a need for a mechanism to enable a mobile station to automatically and dynamically change its air-interface settings or parameters to conform to a service area associated thereto.

SUMMARY OF THE INVENTION

A method and apparatus for effectuating a service area dependent air-interface between a mobile station and a serving mobile telecommunications network is disclosed. Each service area within a serving mobile telecommunications network is associated with data indicating the terrestrial environment representative of said area. Such data may, for example, indicate whether said service area is either urban, suburban, or rural area. Such data are then broadcast over a control channel, such as a Broadcast Control Channel (BCCH), to a mobile station currently located within that service area. The mobile station receives the data and adjusts its air-interface settings and parameters in accordance with the terrestrial environment indicated in the broadcast data. For example, in the case of an urban service area, the mobile station utilizes high power output, high data sensitivity level, and appropriate equalizer parameters to effectuate an air-interface with the serving mobile telecommunications network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
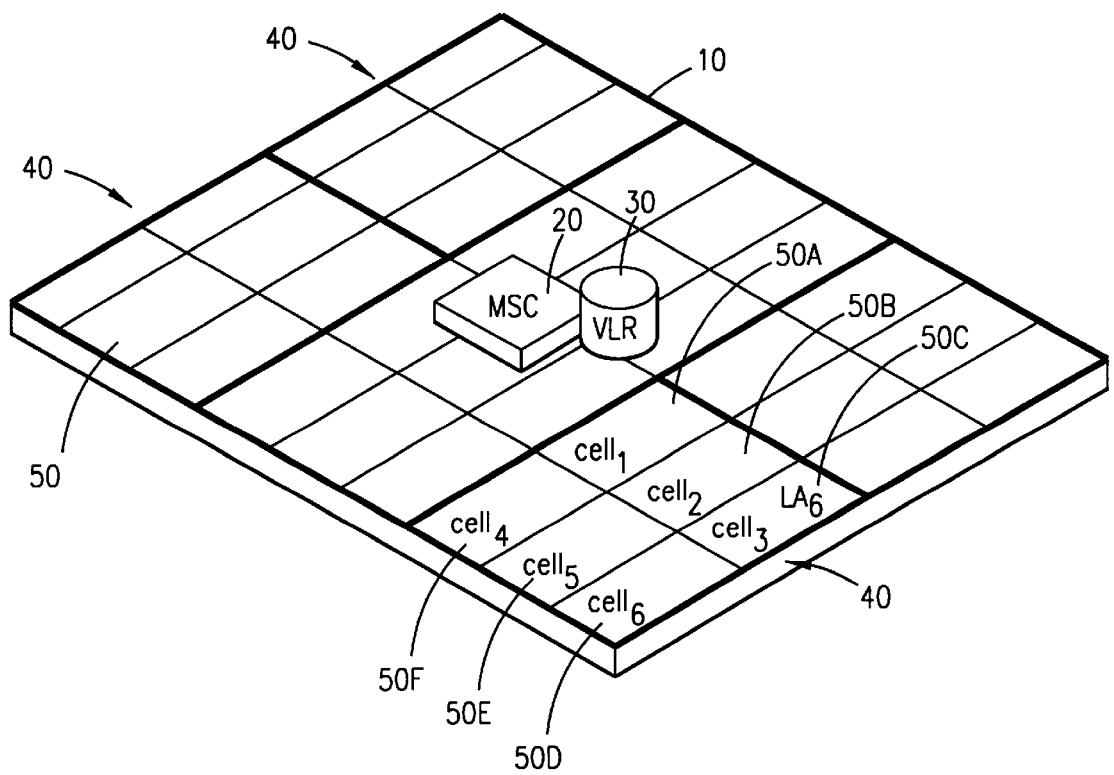
FIG. 1 is a block diagram of a mobile switching center (MSC) coverage area illustrating a plurality of service areas.

FIG. 1 is a block diagram of a mobile switching center (MSC) coverage area 10 illustrating a plurality of service areas associated therein. A mobile switching center (MSC) 20 and an associated centralized database, such as a visitor location register (VLR) 20, provide mobile service to mobile stations traveling within the associated MSC coverage area 10. As illustrated, each MSC coverage area is divided into a plurality of location areas 40. A location area (LA) 40 is a part of the MSC coverage area in which a mobile station may move freely without updating location information to the MSC 20 and the VLR 30 serving that location area. Therefore, a location area (LA) 40 is the area where a paging message is broadcast to find the called mobile station for an incoming call connection.

Further illustrated by FIG. 1, each location area 40 within a particular MSC coverage area 10 is further divided into multiple cell areas (CAs) 50A–50F. Each cell is served by a separate base transceiver station (BTS, also known as a radio base station—RBS, or base station—BS, not shown in FIG. 1). Each BTS is then associated with a group of frequency channels to effectuate air-interfaces with associated mobile stations. As a traveling mobile station in speech moves from a first cell area to a second cell area, a handover is performed therebetween to enable the mobile station to change cell areas without interrupting associated mobile service.

Figure 2:
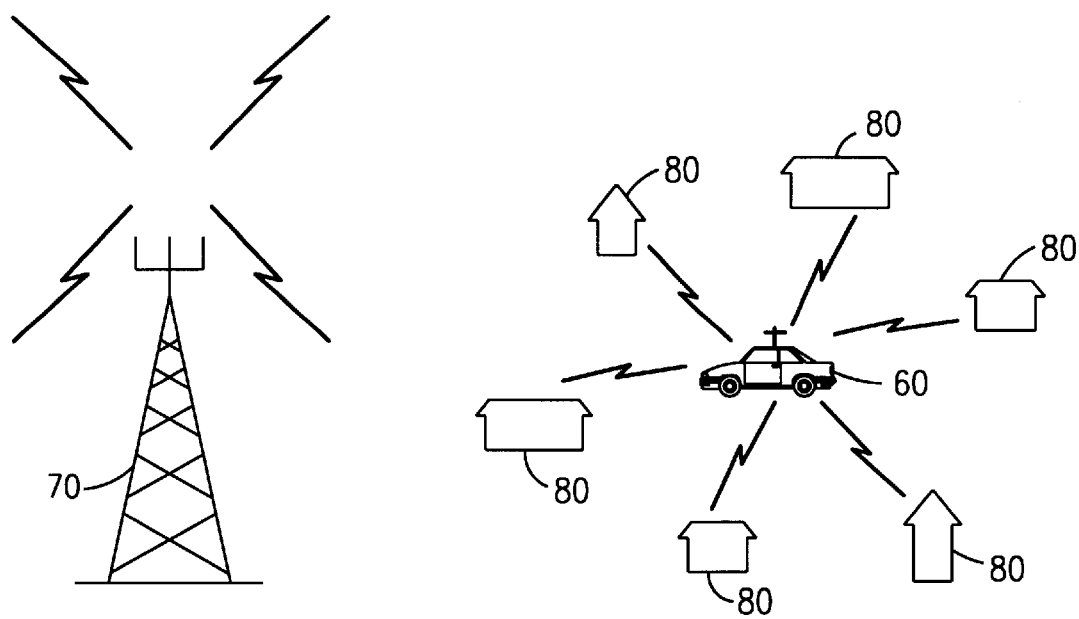
FIG. 2 is a pictorial diagram of an urban service area illustrating tall buildings surrounding a mobile station effectuating an air-interface with a serving base station.

FIG. 2 is a pictorial diagram of a urban service area illustrating tall buildings 80 surrounding a mobile station 60 effectuating an air-interface with a serving base transceiver station (BTS, or base station) 70. Air-interfaces effectuated within each cell area are not uniform or constant. This is because mobile stations are seldom used within an environment without obstacles or terrestrial irregularities. Buildings 80, hills, and other obstacles situated between a particular mobile station 60 and a serving base station 70 decrease or fluctuate the signal strength communicated therebetween. Such a phenomenon is known as a shadowing effect, and as the mobile station moves around, the resulting signal strength decreases and increases depending on whether there are obstacles located between the mobile station and the base station.

When there are numerous obstacles, yet another disturbing effect known as a multipath or Rayleigh fading takes place. This occurs when the signal takes more than one path from the transmitter (Tx) to the receiver (Rx) antenna. For example, because there is no line of sight path between the antennas, a signal is not received directly from the Tx-antennas, but from many directions from where it has bounced or reflected (e.g., buildings).

Another consideration that must be taken for effectuating an air-interface within a particular cell area is a data sensitivity level associated with a particular mobile station. The data sensitivity level indicates the lowest signal strength value required for a specified output to be recognized by the mobile station. As an illustration, if the data sensitivity level associated with a particular mobile station is set to X watts, any signal received with signal strength below the X watts will be lost and not recognized by the mobile station. As a result, as signal strength fluctuates due to different fadings and associated terrestrial conditions, an associated mobile station may not even recognize the transmitted signal.

The transmission problems described above are alleviated somewhat by a mobile station implementing a number of known solutions and/or methods. Such known solutions include adjusting power output to compensate for signal strength loss from fadings; applying appropriate equalizer parameters to recover wanted signals despite severe multipath corruptions; utilizing appropriate scanning algorithms to scan for and to locate an appropriate channel; and setting different data sensitivity levels and fading margins to accommodate different signal strengths.

The adjustment of power output associated with a mobile station is dynamically controllable by a serving mobile telecommunications network. As an illustration, as the serving base station or base station controller (BSC) measures and receives data associated with communicated signal strength from a particular mobile station, the base station or BSC instructs the mobile station to increase or to decrease the associated power output to compensate for the fluctuating while minimizing the power usage, such as a battery life. Accordingly, using a Mobile Attenuation Code (MAC), for example, the serving base station or BSC instructs the mobile station to increase or to decrease power output via a Signal Strength Increase (SSI) parameter or Signal Strength Decrease (SSD) parameter.

However, other remaining settings and parameters are not conventionally dynamically adjustable or controllable by the serving mobile telecommunications network. These values or parameters are typically factory defined within a mobile station and cannot be dynamically adjusted as the mobile station utilizes mobile service within different geographic areas or environments. As an illustration, equalization is a technique that allows a mobile station or the serving mobile telecommunications network to recover a wanted signal despite severe multipath corruption. Equalization works by making an estimate of the impulse response of the transmission medium and then constructing an inverse filter through which the received signal is passed. Such equalization algorithms or parameters are predefined and preset within each mobile station.

These algorithms or parameters are not dynamically adjustable by a serving mobile telecommunications network, for example, because there currently exists no mechanism for communicating such adjustment data between a mobile station and a serving mobile telecommunications network. Furthermore, requiring the serving mobile telecommunications network to evaluate the received data and to instruct the associated mobile station in a manner similar to the adjustment of power output requires additional calculation and channel utilization. Signal protocols further need to be modified to include new signals and parameters. The existing technology may also not be able to individually and accurately ascertain or estimate proper parameters or values, such as the sensitivity level and scanning algorithms, for each mobile station and to individually instruct the affected mobile station for adjustment. Consequently, for a number of reasons, traveling mobile stations cannot conventionally adapt to or conform to changing terrestrial conditions and environments by adjusting or utilizing different scanning algorithms, equalizer parameters, data sensitivity level, etc.

Figure 3:
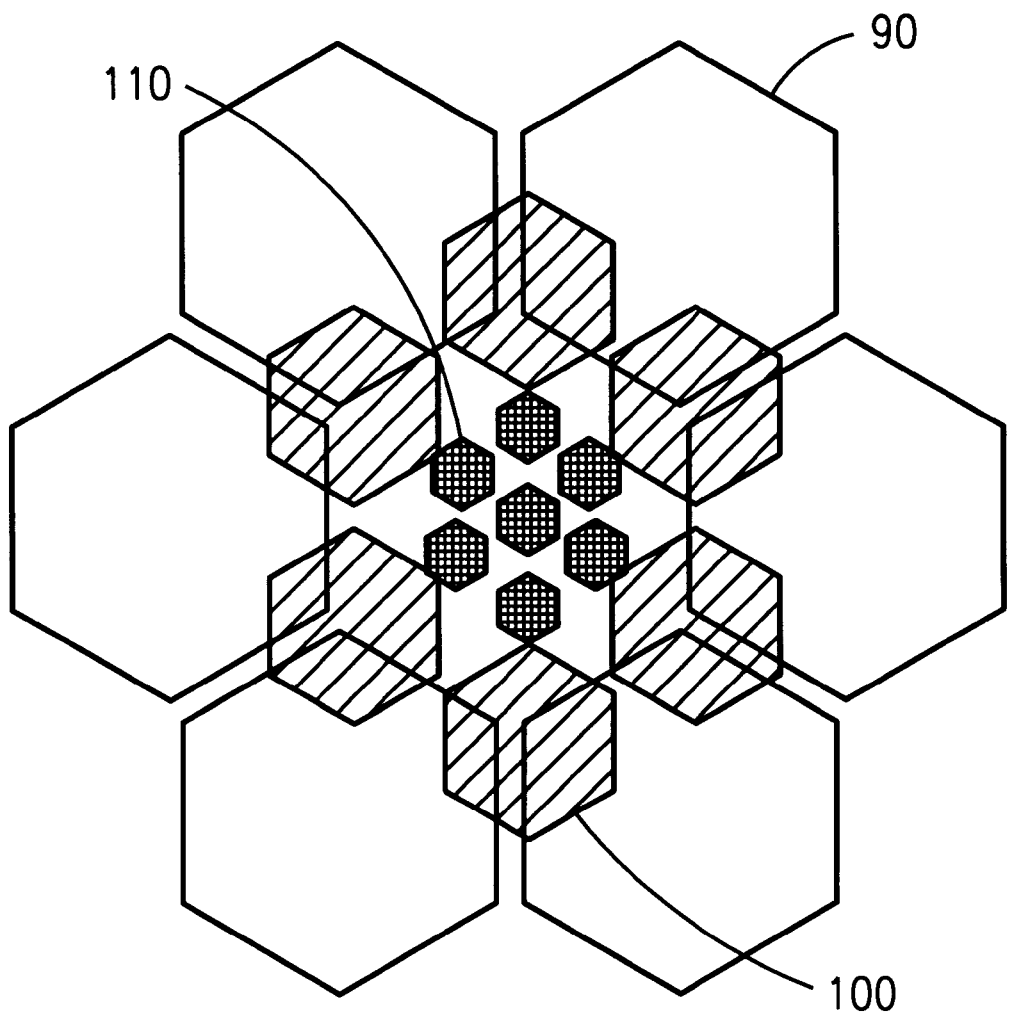
FIG. 3 is a pictorial diagram of a plurality of cell areas each categorized in accordance with associated terrestrial characteristics.

Reference is now made to FIG. 3 which is a pictorial diagram of a plurality of cell areas each categorized in accordance with associated terrestrial characteristics. As an illustration, macro cells 90 covering rural areas are categorized by the present invention as rural cells with few obstacles and terrestrial irregularities (low terrestrial irregularities). Micro cells 100 covering residential and suburban areas are categorized by the present invention as suburban cells with a larger number of man made obstacles and/or terrestrial irregularities (medium terrestrial irregularities). Lastly, pico cells 110 covering downtown areas and business districts are categorized by the present invention as urban areas with numerous high-rises and tall buildings (high terrestrial irregularities).

As the system and method of the present invention are applicable to any cell plan or configuration and/or to analog and digital mobile communications systems wherein a plurality of cell areas cover a geographic area associated with a serving mobile telecommunications network, it will be understood that the description of the present invention in the context of pico, micro, and macro cells provided herein is by way of explanation of the invention rather than of limitation of the scope of the invention.

Figure 4:
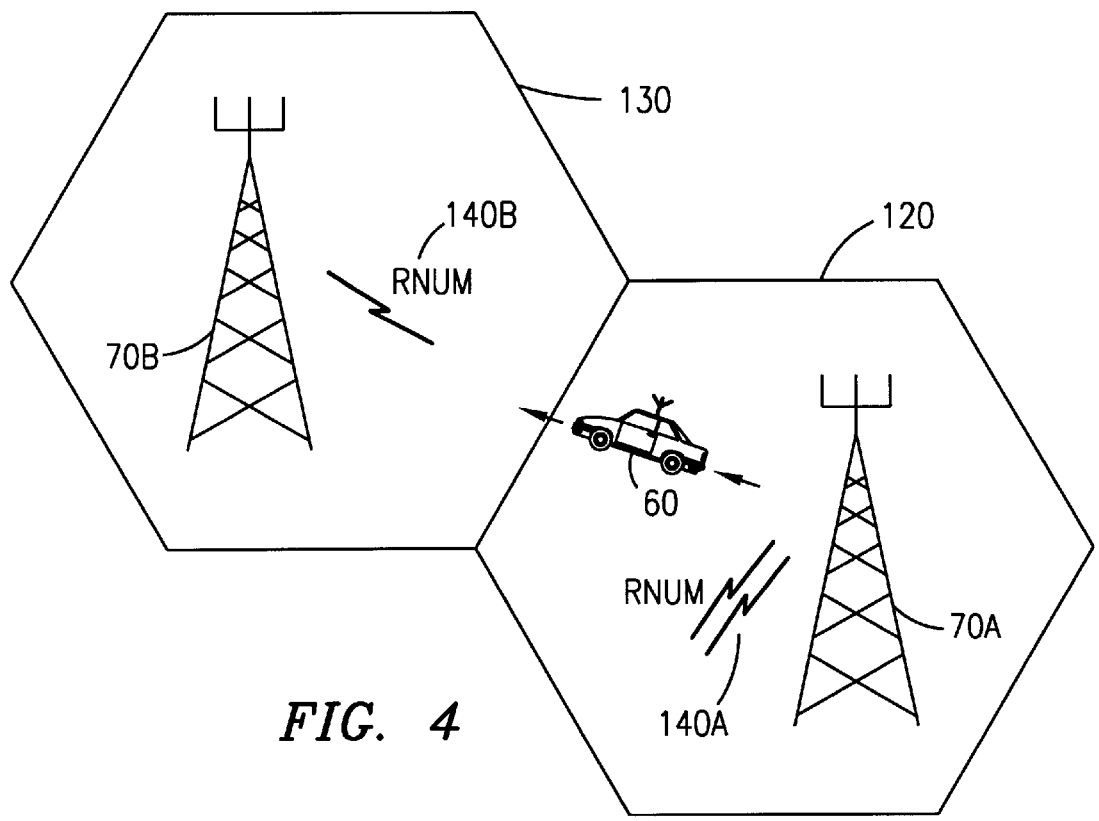
FIG. 4 is a block digram of a mobile coverage area illustrating a mobile station traveling from a first service area associated with a first terrestrial environment to a second service area associated with a second terrestrial environment.

FIG. 4 is a block diagram of a mobile coverage area illustrating a mobile station traveling from a first service area associated with a first terrestrial environment to a second service area associated with a second terrestrial environment. Each cell area within a particular service area is categorizied, for example, as a urban, suburban, or rural service area as fully described above. Thereafter, each base transceiver station (BTS) or base station 70 serving that particular cell area broadcasts data indicative of the assigned category to mobile stations currently traveling within its cell area. Such data may be peridocally broadcast over a control channel and received by all mobile stations traveling therein.

As an illustration, a first cell area 120 being served by a first BTS or BS 70A is categorized as a urban area with high terrestrial irregularities. Accordingly, the serving first BTS 70A broadcasts cell data informing all mobile stations currently traveling within its cell area of the associated cell category. Such cell data representing the associated cell category may be included, for example, within a Registration Parameter message broadcast over a Broadcast Control Channel (BCCH). A registration number (RNUM) List parameter within the transmitted Registration Parameter message specifies the associated cell category. Certain unused two bits within the RNUM list parameter, for example, may be used to denote the assigned cell category (e.g., 01=urban, 11=suburban, 10=rural). As another embodiment of the present invention, a new BCCH message or a new field within an existing BCCH message may further be introduced to broadcast the cell category data to mobile stations traveling within the associated cell area. Available BCCH messages within a Global System for Mobile (GSM) communications standard are well known within the mobile telecommunications field, and will not be discussed in detailed herein.

A mobile station 60, for example, then receives the broadcast data and accordingly adjusts its settings and parameters to effectuate an optimal air-interface within the first cell area 120. Such settings and/or parameters include, but are not limited to, scanning algorithm settings, equalizer parameters, data sensitivity level, and power output level. As a result, the resulting air-interface is adaptive or customized to the surrounding terrestrial conditions.

As the mobile station 60 travels out of the first cell area 120 and into a second cell area 130, the roaming mobile station 60, either in busy or idle mode, receives the new cell data being transmitted by a second BTS 70b serving the second cell area 130. The new broadcast cell data 140B indicative of the second cell area's terrestrial conditions then inform the traveling mobile station 60 to re-set or adjust associated parameters in effectuating an air-interface with the second BTS 70B. As an illustration, if the mobile station has traveled out of a urban cell area and into a rural cell area, the mobile station 60 accordingly lowers the power output, decreases the data sensitivity level, and applies a different scanning algorithm and equalizer parameters.

Figure 5:
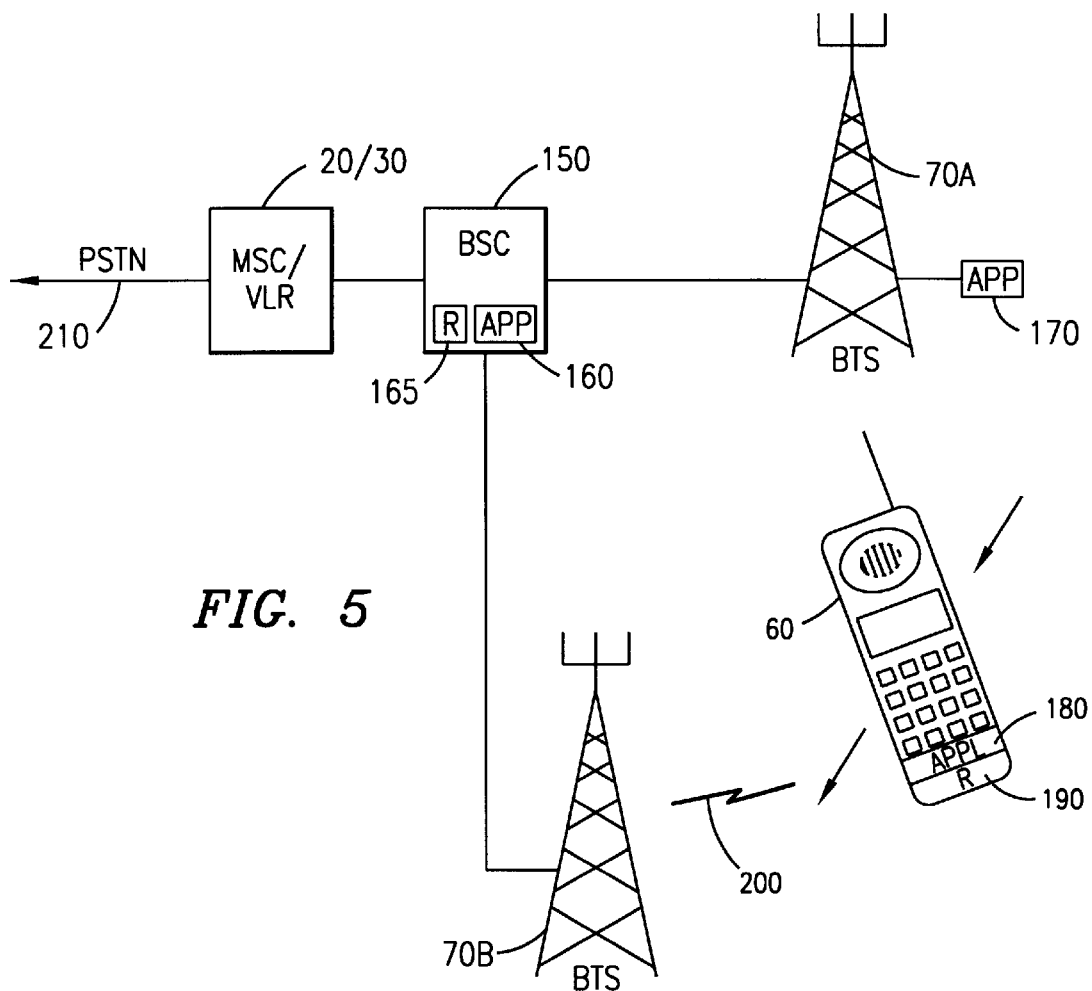
FIG. 5 is a block diagram of a serving mobile telecommunications network illustrating the broadcasting of data indicative of the associated terrestrial condition to an associated mobile station in accordance with the teachings of the present invention.

FIG. 5 is a block diagram of a serving mobile telecommunications network illustrating the broadcasting of cell data indicative of the associated terrestrial condition to an associated mobile station in accordance with the teachings of the present invention. A number of cell areas within a single location area (LA) may be served by a particular base station controller (BSC) 150, which is in turn connected to an associated mobile switching center/visitor location register (MSC/VLR) 20/30. An application module 160 associated with the serving BSC 150 then stores data indicative of the associated terrestrial conditions for each BTS associated therewith. As illustrated above, each BTS or BS then serves the respective cell area within such a location area. Such data for each of the BTSs may be stored at a register 165 associated with the application module 160. The application module 160 then instructs each BTS to periodically broadcast data indicative of the associated terrestrial conditions throughout the respective cell area. As an illustration, the application module instructs a first BTS 70A serving a first cell area to broadcast binary data "01" within the RNUM List parameter to inform a mobile station 60 of the urban terrestrial characteristics associated with the first cell area.

An application module 180 associated with the mobile station 60 then receives the broadcast message, for example, over the BCCH and determines that the current cell area is a urban area. The application module 180 then retrieves the relevant settings and parameters values from an associated register (R) 190. The register (R) 190 therefore stores appropriate settings and parameter values to be used for each of the cell area categories. After retrieving the appropriate settings and parameters adaptive to the current terrestrial conditions, the mobile station utilized the retrieved data while effectuating an air-interface with the serving BTS 70A.

In a similar manner, the application module 160 associated with the serving BSC 150 similarly instructs a second BTS 70B serving a second cell area to broadcast its respective cell data over the assigned BCCH. As the mobile station 60 travels into the second cell area, the application module 180 associated with the traveling mobile station receives the broadcast data and determines that the mobile station is now within, for example, an urban area. The application module 180 then retrieves the relevant settings and parameters from the associated register (R) 190 and utilizes such data while effectuating an air-interface within the second cell area in accordance with the teachings of the present invention. Accordingly, as a mobile station travels between multiple cell areas with different conditions and characteristics, the mobile station receives the cell category data over the relevant BCCH, retrieves the appropriate settings and parameter values associated with the received cell category from the associated register, and automatically adapts to the surrounding terrestrial environment while effectuating an air-interface with the serving telecommunications network.

As another embodiment of the present invention, each BTS 70 is individually associated with an application module 170. Instead of the serving BSC 150 instructing each BTS to broadcast certain cell data over the respective cell area, each BTS 70 independently stores and broadcasts its own cell data over the associated coverage area. Accordingly, the application module 170 associated with each BTS 70 broadcasts cell data indicative of the current terrestrial condition to all mobile stations currently traveling within the respective coverage area.

Utilizing the retrieved air-interface settings and parameters in accordance with the received cell category data, the mobile station 60 effectuates an air-interface 200 adapted to that particular terrestrial condition. The communicated data are then received by the serving BTS 70 and transported to the serving MSC/VLR 20/30. The MSC/VLR 20/30, for example, then determines a called party terminal and reroutes such received data over a connected Public Switched Telephone Network (PSTN) 210.

Figure 6:
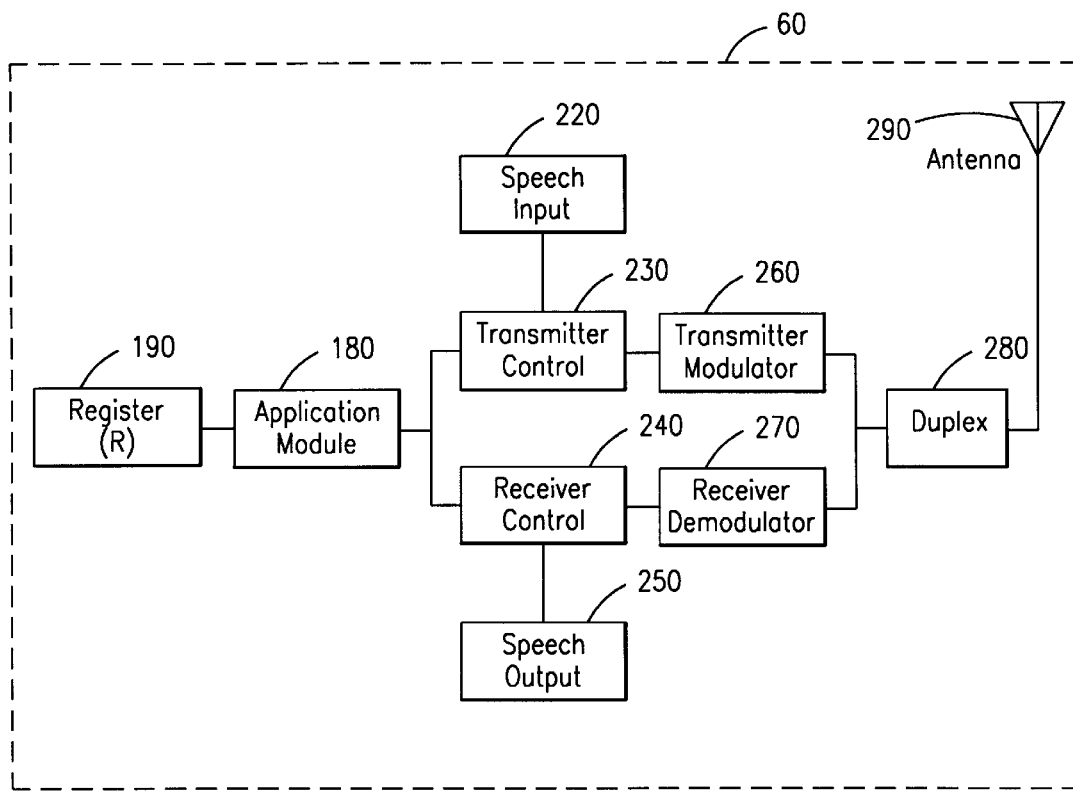
FIG. 6 is a block diagram of a mobile station illustrating the adjustment of appropriate parameters and settings in accordance with the received terrestrial condition data.

FIG. 6 is a block diagram of a mobile station 60 illustrating the adjustment of appropriate parameters and settings in accordance with the received terrestrial condition data. The mobile station 60 is equipped with an antenna 290 suitable for the radio frequencies that are licensed and allocated within the radio spectrum set aside for a particular mobile service. Generally, two radio channels must be allocated to each mobile for duplex operation. One for receiving signals from and the other for transmitting signals toward the serving mobile telecommunications network. Accordingly, a duplex module 280 is associated with the antennas 290. A transmitter modulator 260 is connected to the duplex module 280 for transmitting signals towards the serving base station. Similarly, a receiver demodulator 270 is associated with the duplex 280 for receiving signals transmitted by the serving base station. The transmitter modulator 260 is connected to a transmitter control module 230 for controlling associated attributes while transmitting signals to the serving base station. The transmitter control module 230 is further associated with a speech input device, such as a microphone, for receiving voice data from a subscriber and feeding the data into the transmitter modulator 260. The receiver demodulator 270 is connected to a receiver control module 240 for controlling associated attributes while receiving signals from the serving base station. The receiver control module 240 is further associated with a speech output device 250, such as a speaker, for outputting the received voice data to the associated subscriber.

In accordance with the teachings of the present invention, an application module 180 is further associated with both the transmitter control module 230 and the receiver control module 240. After receiving control data representing the terrestrial conditions associated with the current service area via the receiver control module 240, the application module 180 determines whether the current settings and parameters being utilized by the transmitter control module 230 and the receiver control module 240 need to be adjusted. In response to an affirmative determination, the application module 180 then retrieves the appropriate values and parameters from an associated register (R) 190. As described above, the register (R) 190 already stores appropriate data for each of the categorized service areas. The application module 180 then instructs the transmitter control module 230 and/or the receiver control module 240 to effectuate an air-interface using the retrieved parameters and settings.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for effectuating a location adaptive air-interface with a mobile station traveling within a particular geographic service area associated with a particular mobile telecommunications network, said method comprising the steps of:

categorizing said geographic service area in accordance with any associated obstacles or terrain characteristics which influence air-interface quality within the geographic service area; and transmitting data indicating said categorized geographic service area to said mobile station traveling within said geographic service area, said transmitted data instructing said mobile station to configure its transceiver operational settings to effectuate an optimal air-interface taking into account said obstacles and terrain characteristics.

2. The method of claim 1 wherein said step of categorizing said geographic service area further comprises the step of categorizing said service area into an urban, suburban, or rural area.

3. The method of claim 1 wherein said step of transmitting said data further comprises the step of broadcasting said data over a control channel.

4. The method of claim 3 wherein said step of broadcasting said data further comprises the step of broadcasting said data within a system overhead message.

5. The method of claim 3 wherein said step of broadcasting said data further comprises the step of broadcasting said data over a broadcast control channel (BCCH).

6. The method of claim 5 wherein said step of broadcasting said data further comprises the step of broadcasting said data within registration number (RNUM) data.

7. A method for effectuating a location adaptive air-interface by a mobile station traveling within a particular geographic service area with a particular mobile telecommunications network, said method comprising the steps of:

receiving a system information message at said mobile station broadcast by a base transceiver station (BTS) serving said particular geographic service area, wherein said geographic service area is categorized in accordance with any obstacles or terrain characteristics which influence air-interface quality within said geographic service area;

said system information message indicating said categorized geographic service area and instructing said mobile station to configure its transceiver operational settings to effectuate an optimal air-interface taking into account obstacles and terrain characteristics associated with said categorized geographic service area;

determining at said mobile station said obstacles or terrain characteristics associated with said categorized geographic service area which influence air-interface quality by evaluating data received within said system information message; and configuring said mobile station transceiver operational settings to effectuate said optimal air-interface responsive to said system information message.

8. The method of claim 7 wherein said step of receiving said system information message further comprises the step of receiving a system overhead message over a control channel.

9. The method of claim 8 wherein said control channel comprises a Broadcast Control Channel (BCCH).

10. The method of claim 8 wherein said data indicating said associated obstacles and terrain characteristics are included within a registration number (RNUM) parameter within said broadcasted system overhead message.

11. The method of claim 7 wherein said data determining said associated obstacles and terrain characteristics indicate whether said geographic service area is an urban, suburban, or rural area.

12. The method of claim 7 wherein said mobile station utilizes a data sensitivity level associated with said determined associated obstacles and terrain characteristics.

13. The method of claim 7 wherein said mobile station adjusts to an equalizer parameter value associated with said determined associated obstacles and terrain characteristics.

14. The method of claim 7 wherein said mobile station configures an associated receiver to handle high reflections associated with said determined associated obstacles and terrain characteristics.

15. A mobile telecommunications system for effectuating a location adaptive air-interface with a mobile station traveling within a particular geographic service area, said system comprising:

a mobile telecommunications node providing radio coverage for said mobile station traveling within said geographic service area;

a register associated with said mobile telecommunications node, said register storing data indicating any obstacles or terrain characteristics representative of said geographic service area; and an application module associated with said register for broadcasting said data stored within said register to said mobile station, said data instructing said mobile station to configure its transceiver operational settings to effectuate an optimal air-interface while taking into account said indicated obstacles and terrain characteristics.

16. The system of claim 15 wherein said mobile telecommunications node comprises a base station (BS) providing radio coverage over said geographic service area.

17. The system of claim 16 wherein said geographic service area comprises a cell area.

18. The system of claim 15 wherein said data stored at said register indicates whether said geographic service area is an urban, suburban, or rural area.

19. The system of claim 15 wherein said application module broadcasts said data over a control channel to said mobile station.

20. The system of claim 19 wherein said application module broadcasts said data over a Broadcast Control Channel (BCCH) wherein said data are included within a system overhead message.

21. The system of claim 20 wherein said data are included within a registration number (RNUM) parameter within said system overhead message.

22. A mobile station for effectuating an optimal air-interface with a serving mobile telecommunications network, said mobile station currently traveling within a particular geographic service area, comprising:

a register storing a plurality of parameter settings, each of said parameter settings associated with a geographic service area which is categorized by associated obstacles and terrain characteristics which influence air-interface quality within said geographic service area;

a receiver adapted to receive transmitted data indicating said categorized geographical service area, wherein said transmitted data instructing said mobile station to configure its transceiver operational settings to effectuate said optimal air-interface taking into account said obstacles and terrain characteristics; and an application module retrieving an appropriate parameter setting associated with said indicated categorized geographical service area from said register and adjusting said mobile station to configure its transceiver operational setting to effectuate said optimal air-interface in accordance with said retrieved parameter setting.

23. The mobile station of claim 22 wherein said receiver receives said data broadcast over a control channel.

24. The mobile station of claim 22 wherein said parameter setting representing an equalizer setting utilized by said mobile station to configure its transceiver operational setting to effectuate said optimal air-interface.

25. The mobile station of claim 22 wherein said parameter setting represents a data sensitivity level.

26. A method for effectuating an optimal air-interface between a mobile station traveling within a particular geographic service area and a mobile telecommunications network serving said mobile station, said method comprising the steps of:

storing data at a telecommunications node associated with said mobile telecommunications network, said data indicating a terrestrial environment associated with said service area, said terrestrial environment characterized by associated obstacles and terrain characteristics;

broadcasting said data over a control channel from said mobile telecommunications network to said mobile station;

receiving said broadcast data at said mobile station currently traveling within said geographic service area; and instructing said mobile station to configure its transceiver operational settings to effectuate said optimal air-interface with said mobile telecommunications network utilizing an appropriate air-interface parameter associated with said indicated terrestrial environment.

27. The method of claim 26 wherein said terrestrial environment includes a urban, suburban, or rural area.

28. The method of claim 27 wherein said step of effectuating said optimal air-interface further comprises the step of utilizing a data sensitivity level associated with said determined terrestrial environment.

* * * * *

UNITED STATES PATENT AND TRADEMARK OFFICE
CERTIFICATE OF CORRECTION

PATENT NO. : 5,987,322
DATED : November 16, 1999
INVENTOR(S) : Gupta et al.

It is certified that error appears in the above-identified patent and that said Letters Patent is hereby corrected as shown below:

Column 10,
Line 10, replace "representing" with -- represents --.

Signed and Sealed this

Twenty-fifth Day of December, 2001

Attest:

Attesting Officer

JAMES E. ROGAN
Director of the United States Patent and Trademark Office